E. R. PACKER.
SNOW FLANGER.
APPLICATION FILED FEB. 2, 1911. RENEWED SEPT. 14, 1912.
1,057,084.
Patented Mar. 25, 1913.
7 SHEETS—SHEET 1.
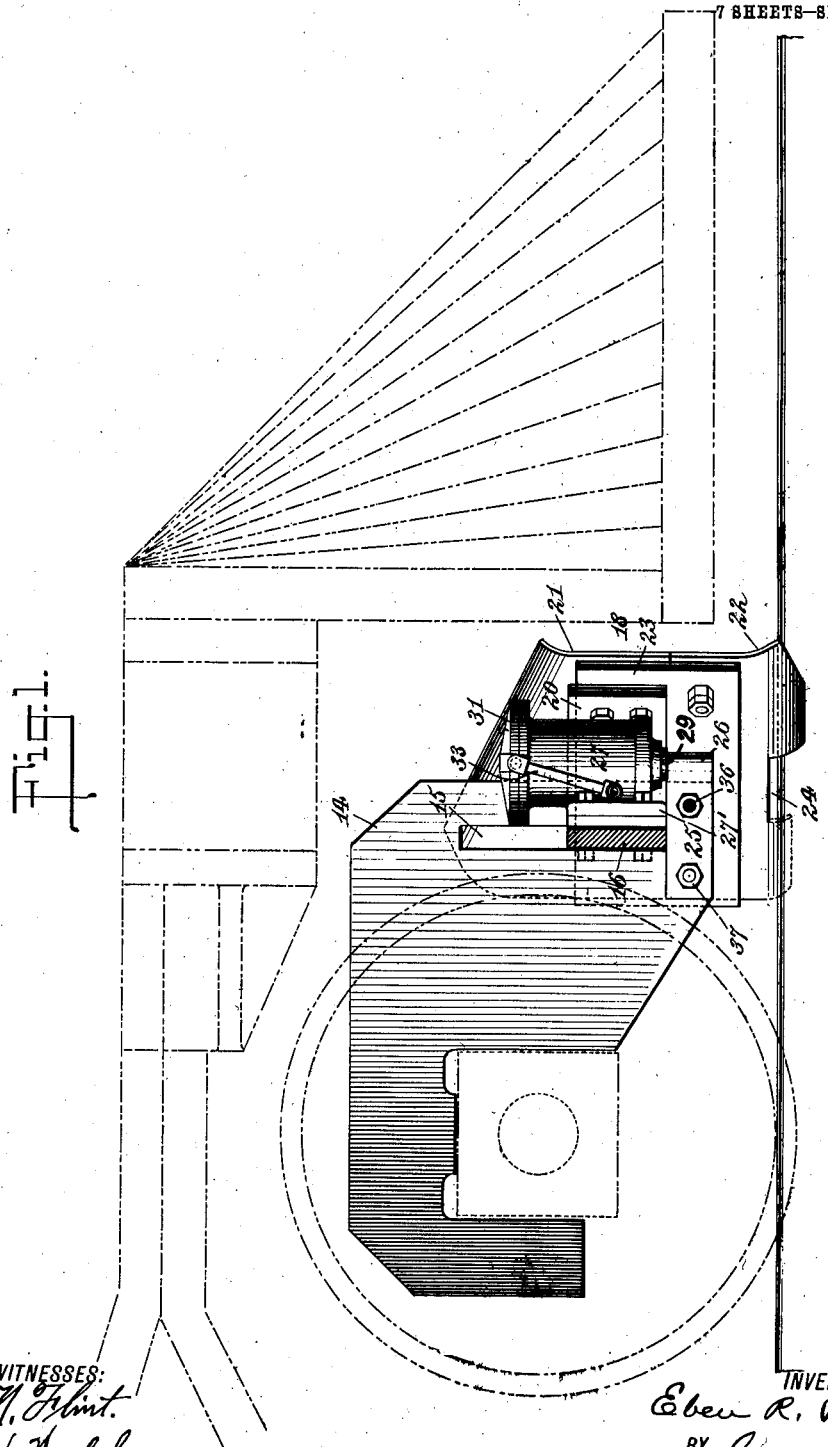

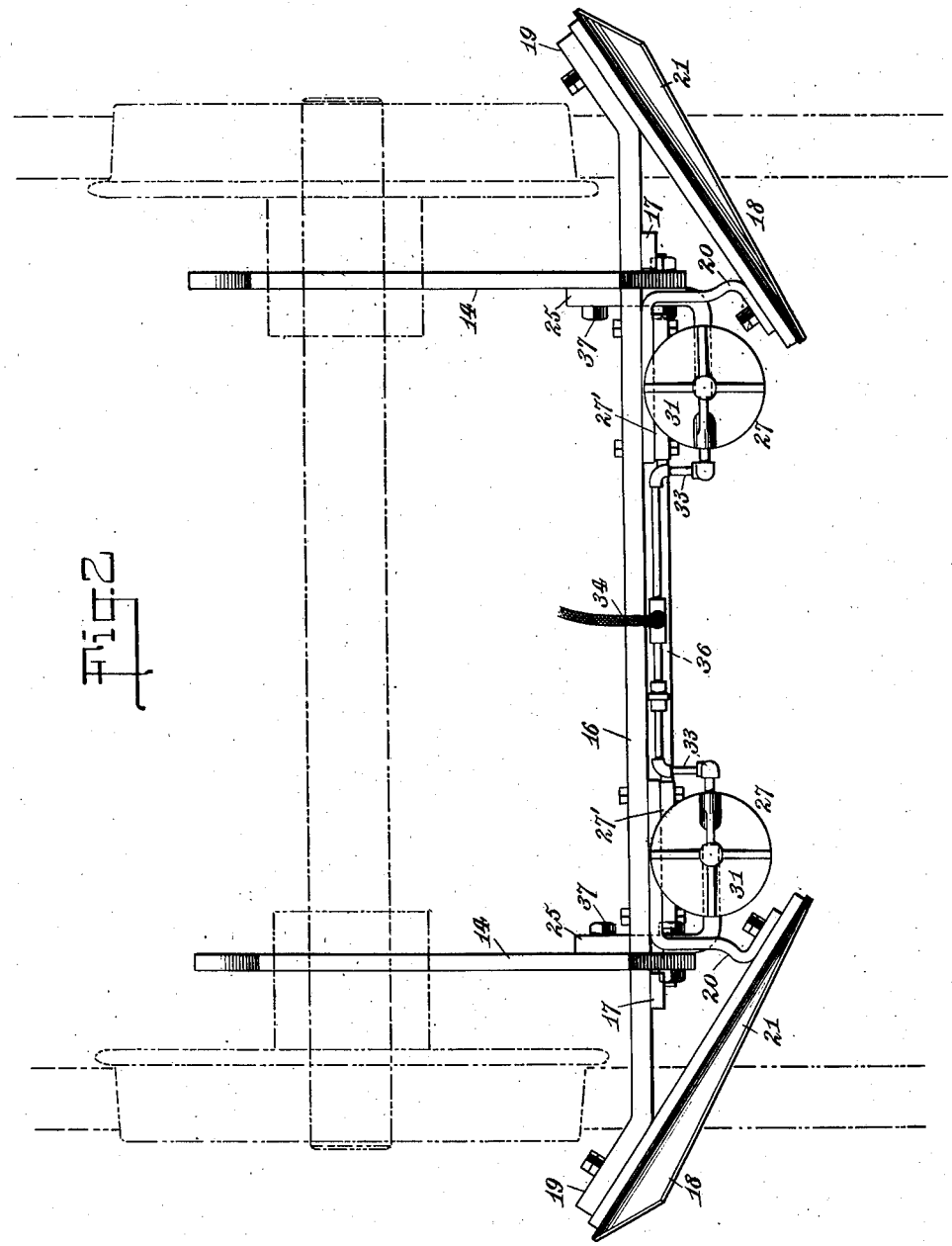

E. R. PACKER.
SNOW FLANGER.
APPLICATION FILED FEB. 2, 1911. RENEWED SEPT. 14, 1912.
1,057,084.
Patented Mar. 25, 1913.
7 SHEETS—SHEET 3.
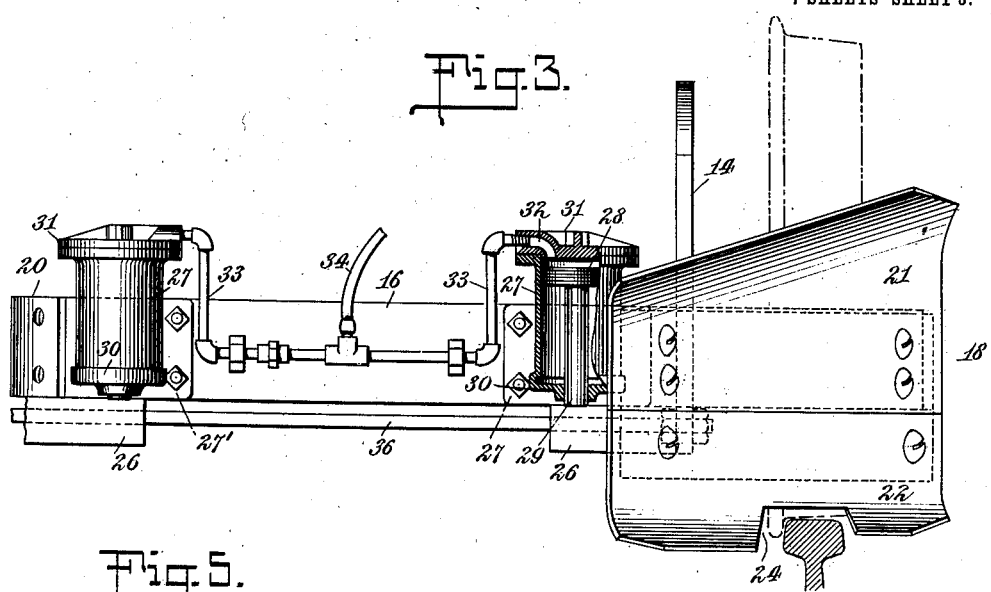
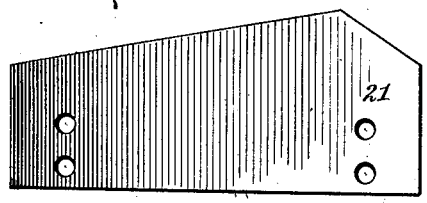
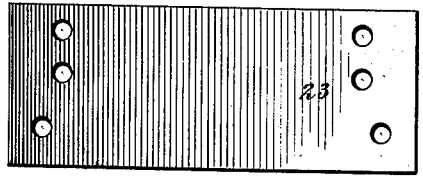
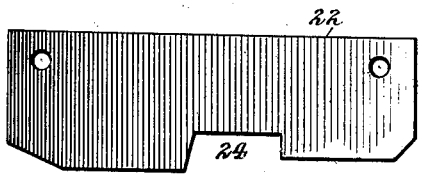
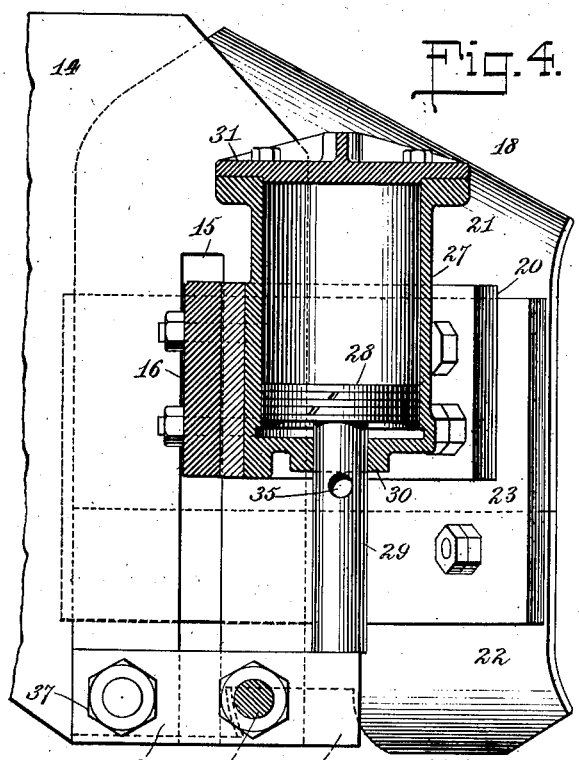

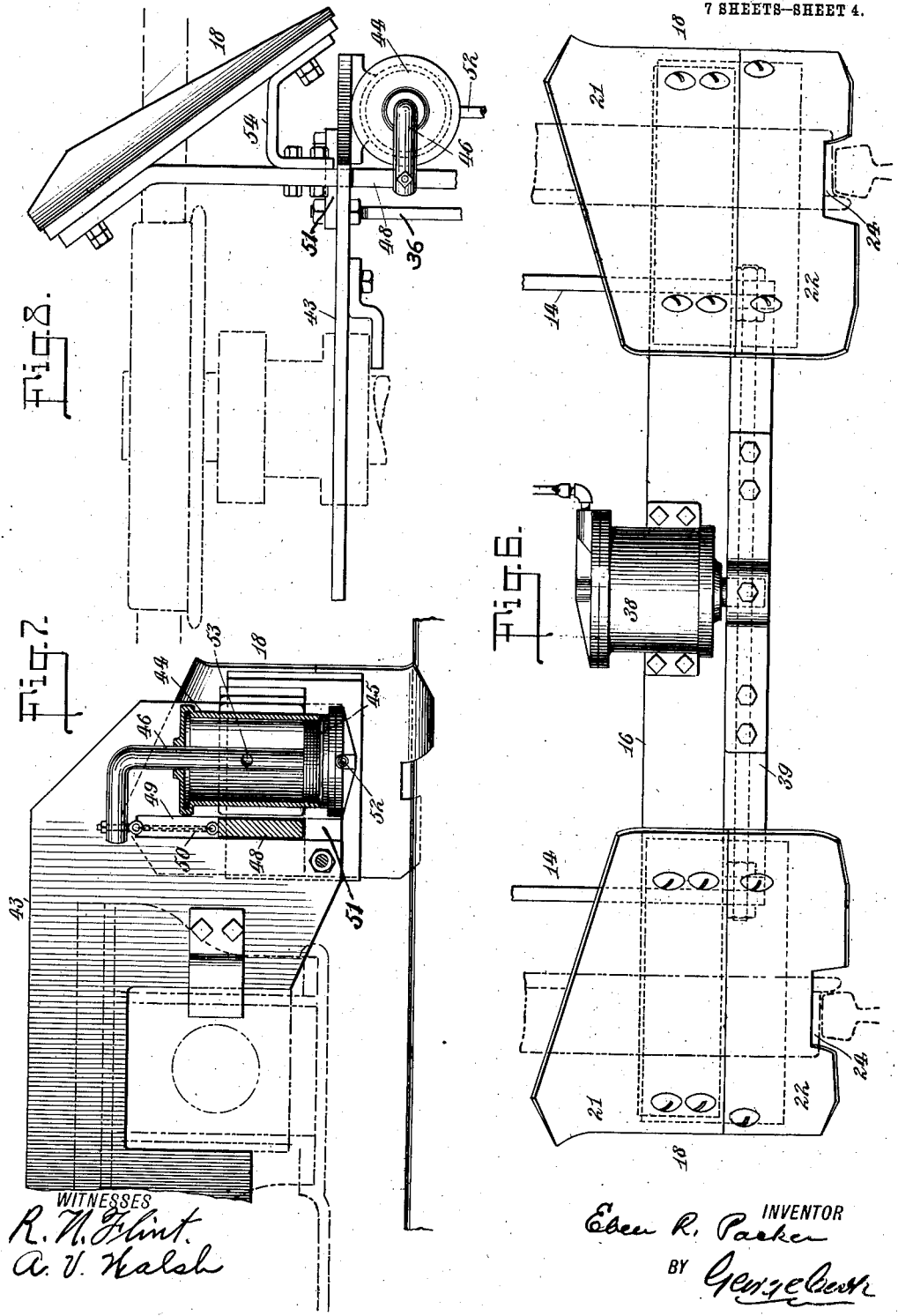

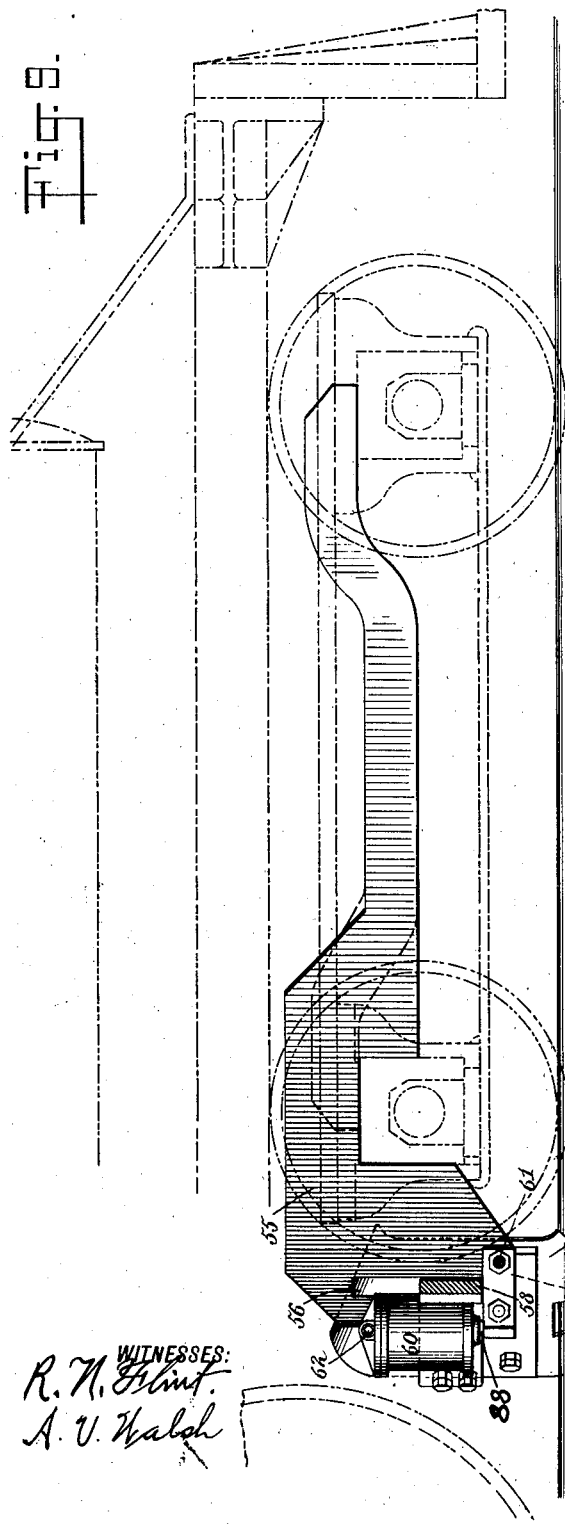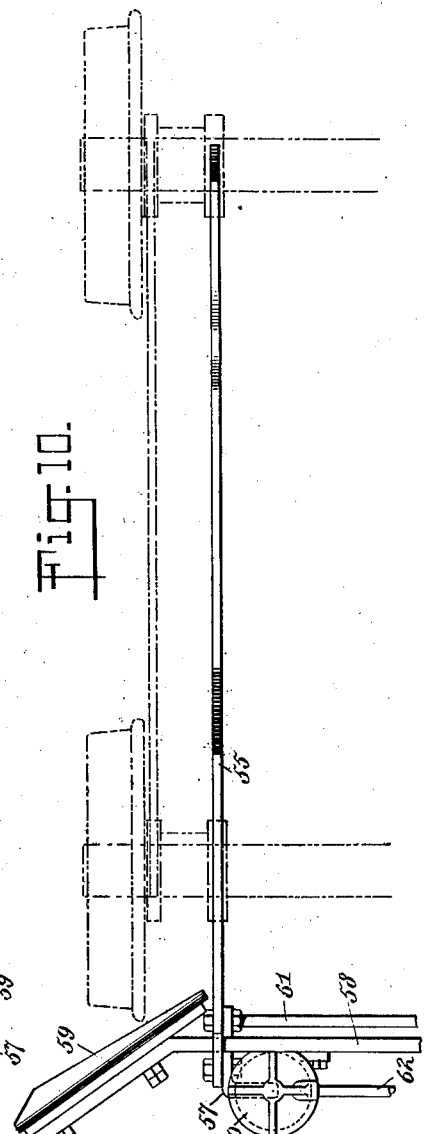

E. R. PACKER.
SNOW FLANGER.
APPLICATION FILED FEB. 2, 1911. RENEWED SEPT. 14, 1912.
1,057,084.
Patented Mar. 25, 1913.
7 SHEETS—SHEET 6.
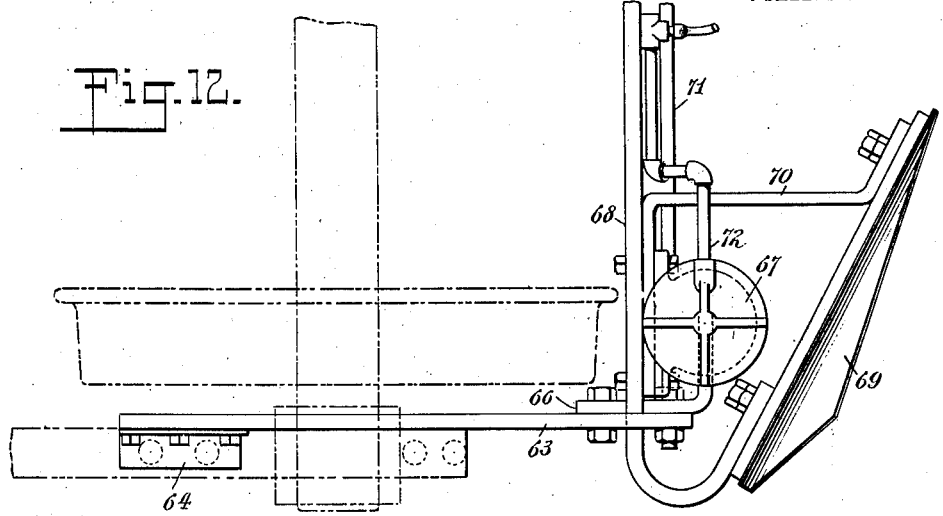
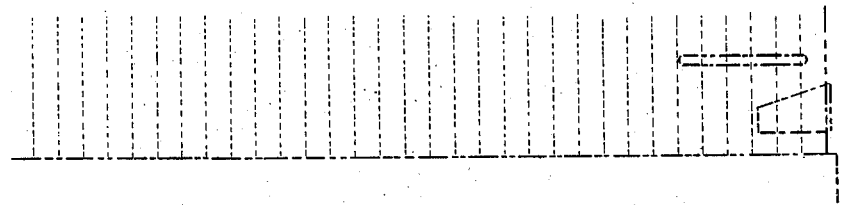
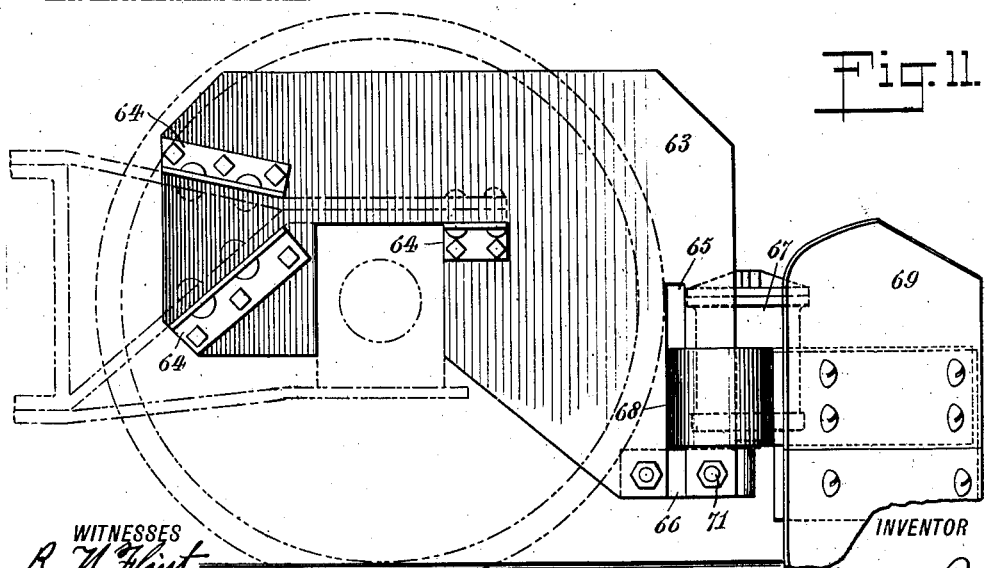

E. R. PACKER.
SNOW FLANGER.
APPLICATION FILED FEB. 2, 1911. RENEWED SEPT. 14, 1912.
1,057,084.
Patented Mar. 25, 1913.
7 SHEETS—SHEET 7.
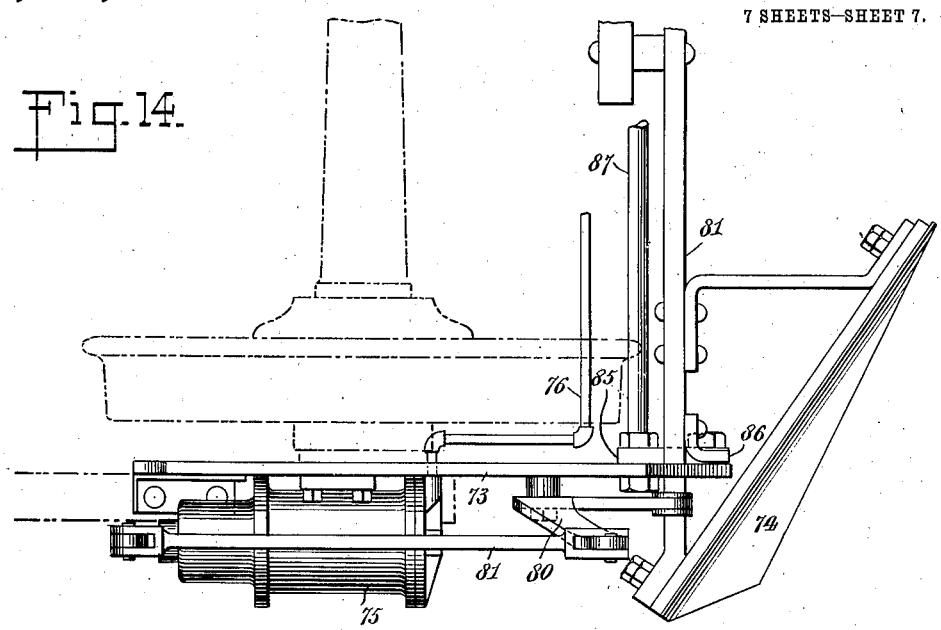
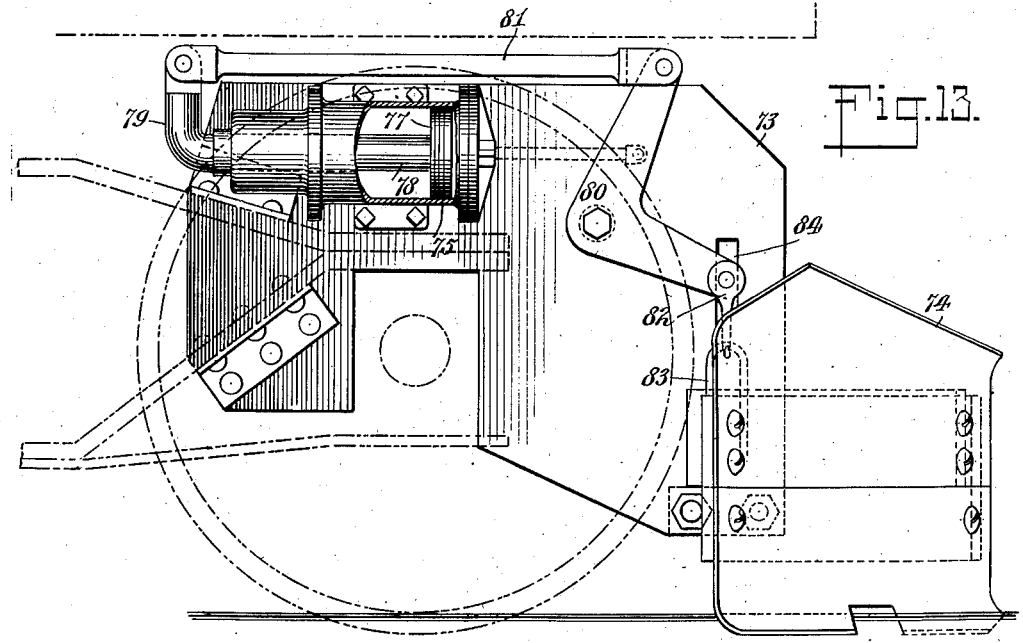

UNITED STATES PATENT OFFICE.

EBEN RAY PACKER, OF CHICAGO, ILLINOIS.

SNOW-FLANGER.

1,057,084.

Specification of Letters Patent.

Patented Mar. 25, 1913.

Application filed February 2, 1911, Serial No. 606,208. Renewed September 14, 1912. Serial No. 720,419.

*To all whom it may concern:*

Be it known that I, EBEN RAY PACKER, a citizen of the United States, and a resident of Chicago, in the county of Cook and State of Illinois, have made and invented certain new and useful Improvements in Snow-Flangers, of which the following is a specification.

My invention relates to snow flangers for use with railway cars or locomotives, the flanger being supported preferably from the forward truck of a locomotive or car and its purpose being to remove snow from the track for a short distance upon each side of the rails; and the object of my invention is to provide snow flanging mechanism all the operating parts of which are supported from the truck of the car or locomotive, thereby securing a compact arrangement of the parts and a mechanism not affected by the movements of the truck relative to the boiler or car body which are met with in practice; to provide a simple and effective device for the purpose above stated; and to provide such other improvements in and relating to snow flangers as are hereinafter referred to and described.

With the objects above enumerated in view my invention consists in the improved snow flanging mechanism illustrated in the accompanying drawing, described in the following specification, and claimed, and in such variations and modifications thereof as will be obvious to one skilled in art to which my invention relates.

In the accompanying drawings wherein the preferred embodiment of my invention is illustrated; Figure 1 is a view illustrating my improved snow flanger and the application thereof to the forward truck of a locomotive, the view being upon a central vertical plane extending longitudinally of the locomotive, and the locomotive being shown in part only and in a conventional manner; Fig. 2 is a view illustrating my improved snow flanger in plan, and showing the relation thereof to the forward truck of the locomotive; Fig. 3 is a view showing my improved snow flanger in elevation and as seen from a position in front of it, a part of the left hand portion thereof being omitted; Fig. 4 is a view showing certain parts of my device enlarged; Fig. 5 is a view illustrating the construction of a blade or wing of my device; Fig. 6 is a view illustrating a modification of my improved snow flanger in front elevation; Fig. 7 is a view similar to Fig. 1 and illustrating another embodiment of my invention; Fig. 8 is a view illustrating the form of my device shown in Fig. 7 in plan; Fig. 9 is a view in side elevation illustrating my improved snow flanger as located to the rear of the wheels of the forward truck of a locomotive; Fig. 10 is a view illustrating the arrangement shown in Fig. 9 in plan; Fig. 11 is a view in side elevation illustrating the application of my improved snow flanger to the truck of a freight or other type of car, some of the parts being slightly modified in form to adapt them for use upon a car; Fig. 12 is a view illustrating the arrangement shown in Fig. 11 in plan; Fig. 13 is a view illustrating in side elevation a slightly modified form of my device as applied to a freight or other type of car; and, Fig. 14 is a view illustrating the form shown in Fig. 13 in plan.

Referring first to Figs. 1 to 8 of the drawings wherein the application of my device to the forward truck of a locomotive is illustrated, 14 are two supports for supporting the various parts of my device, these supports being carried by the forward truck of the locomotive and their shape or form varying somewhat for the various types of forward truck adapted by different builders of locomotives. The supports, however, whatever their specific form may be, always support the operating parts of my device from the front truck of the locomotive and are located one at either side of the truck.

The supports 14 are provided each with a slot 15 extending in a vertical or substantially vertical direction, and 16 is a cross bar extending transversely to the locomotive and through both of said slots which thus form guides for the bar as it is moved in a vertical direction as hereinafter explained. 17 are stops secured to the cross bar and bearing against the supports 14 to thereby prevent the bar from moving sidewise through the slots.

The ends of the cross bar 16 are bent so as to extend at an angle rearward, as shown in Fig. 2, and 18 are two blades or wings secured to the cross bar and inclined so as to throw the snow outward from the track. These wings are secured at their outer portion at 19 to the rearwardly inclined portion of the cross bar, and the inner portions of the wings are supported by braces 20 secured to the cross bar and bent so as to support the wings at a proper angle relative to the direction of travel of the locomotive. These wings are preferably formed of upper and lower portions 21, 22 secured to a strengthening back plate 23, these elements being shown separated in Fig. 5, in order to facilitate the manufacture thereof and secure a rigid wing and one in which the upper and lower portions may be readily and separately removed for purposes of repair, or in order to substitute other portions differing slightly from the form shown, and the lower portion 22 of the wing is commonly provided with a recess 24 to fit over the rail so that the lower edge of the wing will extend somewhat below the head of the rail as will be understood from Fig. 3 of the drawing.

The slots 15 are open at their lower ends, and 25, referring to the form of my invention shown in Figs. 1 to 4 are brackets right-angular in form and secured to the supports 14 and extending across the lower end of the slots 15, and upon which the cross bar rests when in its lowermost position. The free ends of these brackets extend inward toward the center line of the locomotive to form abutments 26 hereinafter more specifically referred to. The cross bar 16, wings 18 and supporting braces 20 thus constitute a single unitary structure supported from the supports 14 and movable vertically in the slots 15, the wings when in their lower operative position being in position to remove snow from the track for a narrow space upon each side of the rails, and when in their upper inoperative position being in position such that they will clear the rails; it being necessary that they be clear of the rails in passing over switches, crossings, etc.

The mechanism whereby the position of the cross-bar and wings is controlled comprises, in the form of my invention shown in Figs. 1 to 4, two cylinders 27 provided with ears 27' whereby they are secured to and consequently move with the cross-bar 16, the cylinder being shown as supported upon the brace 20 although it may obviously rest directly upon the cross bar. Within the cylinder is a piston 28 having a piston rod 29 which extends through and is guided by the lower head 30 of the cylinder, and the extremity of which rod engages the abutment 26 hereinbefore referred to, said abutment being obviously stationary with reference to the cross-bar 16 and wings carried thereby. The upper heads 31 of the cylinders 27 are provided with passages 32, and 33 are conduits secured to and extending along the cross-bar 16 and which conduits communicate with the said passages, and which conduits are joined adjacent the middle of the cross-bar and communicate with a flexible conduit 34.

From the above it will be understood that when there is no pressure within the cylinders 27, the cross-bar and wings will be in their lower and operative position. When, however, compressed air or steam is supplied to the cylinders 27 through the flexible conduit 34, conduits 33 and passages 32, the cylinders together with the cross-bar to which they are secured, and the wings, will be lifted so as to move the wings away from the track and into their inoperative position, it being remembered that the pistons 28 are stationary relative to the cylinders because of the engagement of the lower end of their rods with the relatively fixed abutments 26.

The valves for controlling the supply of fluid to the cylinders as aforesaid will be under the control of the engineer and the same will be provided with the usual exhaust passage for permitting a flow of fluid from the cylinders to again lower the wings into their operative position. The piston rods 29 are provided each with a hole 35 through which a key may be passed when the wings are likely to remain in their operative position for a considerable time. A transverse rod 36 is commonly provided for the purpose of connecting the ends of the supporting members 14 together to thereby strengthen the device, the ends of the rods being threaded and having nuts for properly spacing the supports 14 and securing the brackets 25 thereto forward of the slot 15, the said brackets being secured to the support at the rear of the slot by means of ordinary short bolts 37.

In the form of my invention shown in Fig. 6 a single cylinder 38 is substituted for the two cylinders 27, and a transverse bar 39 is provided, which extends between and connects the ends of the supports 14 and takes the place of the rod 36 in the form previously disclosed, the ends of this bar being bent at right angles and extended across the lower ends of the slots in the said supports, and said ends being secured to said supports at either side of the slots; this bar performing, as will be understood, the function of both the rod 36 and the abutments 26 in the form of my invention first disclosed. In this modified form of my device the piston rod of the piston within the cylinder 38, is shown as connected with the transverse bar instead of merely resting thereupon. The action, however, is the same in that the piston and rod remain relatively stationary while the cylinder and cross bar 16 to which it is secured move in unison when a fluid under pressure is supplied to the cylinder.

In the form of my invention shown in

Figs. 7 and 8 the operating cylinders are relatively stationary and the pistons are movable and operatively connected with a cross-bar which carries a wing at each end as in the forms hereinbefore disclosed. These figures disclose one end only of the cross-bar and a single cylinder, but it will be understood that two cylinders are provided in the complete device, one adjacent each wing. In the form of my invention disclosed in these views 43 is one of two supporting members carried by the forward truck of the locomotive, a portion thereof being shown in dotted lines, and 44 is a cylinder which in this case is secured to the forward end of the supporting member. 45 is a piston, and 46 a piston rod extending upward through the upper head of the cylinder 44 and having a member extending at right angles thereto and terminating over a transversely extending cross-bar 48 which has wings at its end of the same form and construction as hereinbefore disclosed. The supporting member 43 is provided with vertically extending slots 49 in which the cross-bar 48 may move vertically, and the piston rod is operatively connected with the cross-bar by means of a connecting member 50 preferably flexible and shown as in the form of a chain. 51 is a bar secured adjacent the lower edge of the supporting member 43 and extending across the open lower end of the slot 49 therein, and upon which the cross bar 48 rests when in its lowermost position. Such being the construction of this form of my device it will be understood that as a fluid under pressure is supplied in the manner aforesaid to the cylinder 44 through the air passage 52 in the lower head thereof, the piston 45 and rod 46 will be forced upward, thus lifting the cross-bar 48 and wings into their upper or inoperative position by means of the chain 50, and that upon the exhaust of fluid from the cylinder the bar and wings will descend into their lower or operative position. A key may be passed through the hole 53 in the piston rod when the cross-bar is in its uppermost position, the hole being then above the upper head of the cylinder, to thus hold the cross-bar and wings up when they are not likely to be used for some time. The brace 54 for the inner ends of each wing in this form of my device terminate in such a position that its end forms a stop similar to the stop 17, for preventing the cross-bar from moving across or transverse to the locomotive.

It will be seen that precisely the same cylinder is capable of use in the form of my device shown in Figs. 7 and 8 as is used in the form shown in Figs. 1 to 4, the cylinder being merely reversed in position or turned end for end in the form last described.

In Figs. 9 and 10 I have illustrated my snow flanging device as located back of the wheels of the forward truck of a locomotive, the purpose of this arrangement being to provide an arrangement wherein torpedoes placed upon the track will not be removed by the flanger before they have been exploded by the wheels of the truck. In this form of my device 55 is one of two supports or equalizers carried by the forward truck of the locomotive, it being understood that such a support is provided upon each side of the locomotive, the same having a vertical slot 56 at its rear end and a bracket 57 extending across the lower end of said slot, said bracket being similar to the bracket 25 hereinbefore described. The reference numeral 58 designates a cross-bar extending transversely to the locomotive and having a blade or wing 59 secured to each end thereof and inclined so as to throw the snow outward from the track, said blade being similar to the blade or wing 18 above described. The bar 58 rests upon the brackets 57 when in its lower position, and 60 is one of two cylinders secured to the cross-bar 58 and having pistons the lower ends of the rods 88 of which engage the right angular extending portions of the brackets 57, as will be understood from Fig. 10. 61 is a rod extending between the supporting member 55, and 62 is a conduit through which fluid under pressure is supplied to the cylinders 60. While I have illustrated this form of my device as provided with operating mechanism such as is illustrated in Figs. 1 to 4, it will be understood that the arrangement of operating mechanism shown in Figs. 6, or 7 and 8, is equally applicable to the form of my device shown in Figs. 9 and 10.

Figs. 11 and 12 illustrate my improved snow flanging device as applied to a freight or other type of car, it being often desirable to have a part at least of the cars of a train equipped with snow flangers. In these figures 63 shows one of two supports secured one to each of the side frames of the truck by means of brackets 64, these supports being outside the wheels because in cars the journal boxes and framing which supports them, the same being shown in dotted lines in these figures, are on the outer side of the wheels. 65 is a vertical slot in the support 63, and 66 is a bracket extending across the lower end of said slot and the end of which is bent at right angles to provide an abutment for the lower end of a piston rod extending downwardly from a piston within the cylinder 67, these elements being similar to elements hereinbefore described. Extending transversely to the car and through the slots 65 is a cross-bar 68, the ends of which are bent so as to form a support for blades or wings 69 similar to the wings already described. A brace 70 is provided for giving additional support to the wings. 71 is a rod connecting the supports 63, and 72 is a conduit through which fluid may be supplied to the cylinders 67. It will be understood that a single operating cylinder such as is shown in Fig. 6, or stationary cylinders such as are shown in Figs. 7 and 8, may be substituted for the operating cylinders shown in Figs. 11 and 12.

In the form of my improved snow flanging device shown in Figs. 13 and 14 I have shown the operating cylinders arranged differently with respect to the blades or wings than in the forms hereinbefore described. In these figures, 73 is one of two supports secured to the side frame of the truck of a car in the manner above described. In this form of my device the operating cylinders for raising the wings or blades 74 are carried by the supports 73 and located remote from the blades, one of said cylinders being shown at 75, the same being secured to the upper and rear portion of the support 73. Fluid under pressure is supplied to the cylinders 75 through a conduit 76; 77 is a piston, and 78 a rod connected therewith and extending rearwardly and outside of the cylinder where it is provided with an arm 79. The reference character 80 represents a bell crank lever pivoted to the support 73, and 81 is a link connecting one arm of this lever with the arm 79. The other arm of the lever 80 is operatively connected with a transverse bar 81 which carries the wings 74 at its ends by means of links 82, 83. The supports 73 are provided with vertical slots 84 in which the cross-bar 81 moves, 85 is a support extending across the lower end of the slot 84 and upon which the cross-bar 81 rests when in its lowermost position, 86 cleat secured to the cross-bar 81 for preventing the same from moving sidewise, and 87 is a rod connecting the lower and forward ends of the supports 73. In this form of my device fluid under pressure admitted to the cylinder 75 will force the piston 77 rearwardly thus transmitting motion through the link 81, bell crank lever 80, and links 82, 83 to the cross-bar 81, thus lifting it and the blades or wings 74 which it carries.

In the following claims I refer to the combination of my device with a truck of a railway vehicle because of the fact that my improved snow flanger is applicable to either a locomotive or to a car as hereinbefore explained, and is applicable also, as will be understood from the foregoing description and illustration, to any and all kinds or types of railway vehicles. The improved flanger is, as explained, preferably placed in front of the forward truck of the railway vehicle, although I have also illustrated it as placed to the rear of the forward truck of a locomotive; and it may obviously be placed either in front of or to the rear of either truck of a railway car although in the drawings it is shown only as applied in front of the forward truck of the car.

Having thus described my invention and explained the operation thereof, I claim and desire to secure by Letters Patent:—

1. The combination with a truck of a railway vehicle, of two supporting members carried by said truck and located one at each side thereof; a cross-bar supported by said supporting members and extending transversely to the vehicle and having a wing at each end, said cross-bar being movable toward and from the track upon which the vehicle runs; means upon said supporting members for guiding the cross-bar in its movements; and a motor carried by the truck aforesaid and operable by a fluid under pressure for moving said cross-bar.

2. The combination with a truck of a railway vehicle, of two supporting members carried by said truck and located one at each side thereof; a cross-bar supported by said supporting members and extending transversely to the vehicle and having a wing at each end, said cross-bar being movable toward and from the track upon which the vehicle runs; means upon said supporting members for guiding said cross-bar in its movements; and a motor carried by the truck aforesaid for moving said cross-bar.

3. The combination with a truck of a railway vehicle, of two supporting members carried by said truck and located one at each side thereof, a cross-bar supported by said supporting members and extending transversely to the vehicle and having a wing at each end, said cross-bar being movable vertically toward and from the track upon which the vehicle runs; guides upon said supporting members for guiding said cross-bar in its movements; a cylinder and piston for operating said cross-bar, one of said elements being connected with said cross-bar and the other being carried by the truck aforesaid; and a conduit for supplying fluid under pressure to said cylinder.

4. The combination with a truck of a railway vehicle, of two supporting members carried by said truck and located one at each side thereof; a cross bar supported by said supporting members and extending transversely to the vehicle and having a wing at each end, said cross-bar being movable vertically toward and from the track upon which the vehicle runs; guides upon said supporting members for guiding said cross-bar in its movements; and a motor carried by the truck aforesaid and operable by a fluid under pressure for moving said cross bar in an upward direction.

5. The combination with a truck of a railway vehicle, of two supporting members carried by said truck and located one at each side thereof; each of said members having a vertically extending slot; a cross-bar supported by said supporting member and extending through said slots and having a wing at each end, said cross-bar being movable vertically in said slots; a cylinder secured to and movable with said cross-bar; a conduit through which fluid under pressure may be supplied to said cylinder; a piston within said cylinder; and a piston rod connected with said piston and extending without said cylinder, and the end whereof is fixed relative to said cylinder.

6. The combination with a truck of a railway vehicle, of two supporting members carried by said truck and located one at each side thereof; a cross-bar supported by said supporting members and extending transversely to the vehicle and having a wing at each end, said cross-bar being movable vertically toward and from the track upon which the vehicle runs; guides upon said supporting members for guiding said cross-bar in its movements; a cylinder secured to and movable with said cross bar; a conduit through which fluid under pressure may be supplied to said cylinder; a piston within said cylinder; and a piston rod connected with said piston and extending without said cylinder and the end whereof is fixed relative to said cylinder.

7. The combination with a truck of a railway vehicle, of two supporting members carried by said truck and located one at each side thereof, each of said members having a vertically extending slot; a cross-bar supported by said supporting member and extending through said slots and having a wing at each end, said cross-bar being movable vertically in said slots; two cylinders secured to and movable with said cross-bar; a conduit through which fluid under pressure may be supplied to said cylinders; a piston within each of said cylinders; a piston rod connected with each piston and extending downward and without its cylinder; and a bracket secured to each of said supporting members adjacent the lower edge thereof, said brackets extending across said slots and having each an extension against which the lower ends of said piston rods abut.

8. The combination with a truck of a railway vehicle, of two supporting members carried by said truck and located one at each side thereof; a cross-bar extending transversely to the vehicle and having a wing at each end, said cross-bar being movable toward and from the track upon which the vehicle runs; a cylinder and piston for operating said cross-bar, one of said elements being connected with said cross-bar and the other being carried by the truck aforesaid; and a conduit for supplying fluid under pressure to said cylinder.

9. The combination with a truck of a railway vehicle, of two supporting members carried by said truck and located one at each side thereof; a cross-bar extending transversely to the vehicle and having a wing at each end, said cross-bar being movable vertically toward and from the track upon which the vehicle runs; guides upon said supporting members for guiding said cross-bar in its movements; a cylinder and piston for operating said cross-bar, one of said latter two elements being connected with said cross bar and the other being carried by the truck aforesaid; and a conduit for supplying fluid under pressure to said cylinder.

10. The combination with a truck of a railway vehicle, of two supporting members carried by said truck and located one at each side thereof, each of said members having a vertically extending slot; a cross-bar extending through said slots and having a wing at each end, said cross-bar being movable vertically in said slots; two cylinders secured to and movable with said cross-bar; a conduit through which fluid under pressure may be supplied to said cylinders; a piston within each cylinder; and a piston rod connected with each piston and extending without its cylinder and the end whereof is fixed relative to its cylinder.

11. The combination with a truck of a railway vehicle, of two supporting members carried by said truck and located one at each side thereof, each of said members having a vertically extending slot; a cross-bar extending through said slots and having a wing at each end, said cross-bar being movable vertically in said slots; two cylinders secured to and movable with said cross-bar; a conduit through which fluid under pressure may be supplied to said cylinders; a piston within each cylinder, a piston rod connected with each piston and extending without its cylinder; and an abutment secured to each of said supporting members adjacent the lower edge thereof and against which the lower ends of said piston rods abut.

12. The combination with a truck of a railway vehicle, of two supporting members carried by said truck and located one at each side thereof, each of said members having a vertically extending slot; a cross-bar extending through said slots and having a wing at each end, said cross-bar being movable vertically in said slots; a cylinder secured to and movable with said cross-bar; a conduit through which fluid under pressure may be supplied to said cylinder; a piston within said cylinder; and a piston rod connected with said piston and extending without said cylinder and the end whereof is fixed relative to said cylinder.

13. The combination with a truck of a railway vehicle, of a supporting member secured to and carried by said truck; a wing carried by said supporting member and movable toward and from the track upon which the vehicle runs; and a power device comprising two relatively movable members one of which is carried by said supporting member and the other of which is operatively connected with said wing.

14. The combination with a truck of a railway vehicle, of a supporting member secured to and carried by said truck; a wing carried by said supporting member and movable toward and from the track upon which the vehicle runs; and a power device comprising a cylinder and a piston movable within the same, and means for supplying a fluid under pressure to said cylinder, one of said members being carried by said supporting member and the other being operatively connected with said wing.

Signed at New York borough of Manhattan in the county of New York and State of New York this 23rd, day of January, A. D. 1911.

EBEN RAY PACKER.

Witnesses:
R. N. FLINT,
H. M. WHITE.